Jan. 28, 1969   W. J. SCHMIDT ET AL   3,424,395
METHOD AND APPARATUS FOR WINDING UP TAPES OR FILAMENTS
Filed Feb. 8, 1966                    Sheet 1 of 2

INVENTORS,
WILLI J. SCHMIDT
STEPHAN SCHUCK

BY James E. Bryan
ATTORNEY

United States Patent Office 3,424,395
Patented Jan. 28, 1969

3,424,395
METHOD AND APPARATUS FOR WINDING UP TAPES OR FILAMENTS
Willi J. Schmidt, Kelkheim, Taunus, and Stephan Schuck, Wiesbaden-Frauenstein, Germany, assignors to Kalle Aktiengesellschaft, Wiesbaden-Biebrich, Germany, a corporation of Germany
Filed Feb. 8, 1966, Ser. No. 525,948
Claims priority, application Germany, Feb. 11, 1965,
K 55,252
U.S. Cl. 242—67.1                    8 Claims
Int. Cl. B65h *19/04;* F16d *27/02*

ABSTRACT OF THE DISCLOSURE

A winding shaft is provided with longitudinally extending recess means therein. Coil windings are positioned in the recess means and extend longitudinally of the shaft for generating a magnetic field along a substantial length of the shaft. A winding core is disposed in surrounding relationship to the shaft and supported thereby, an annular space being provided between part of the winding core and part of the winding shaft. A plurality of magnetizable rollers are movably mounted within the annular space for transferring torque from the shaft to the core. A plurality of winding cores may be disposed about longitudinally spaced portions of the shaft.

---

Figure 1:
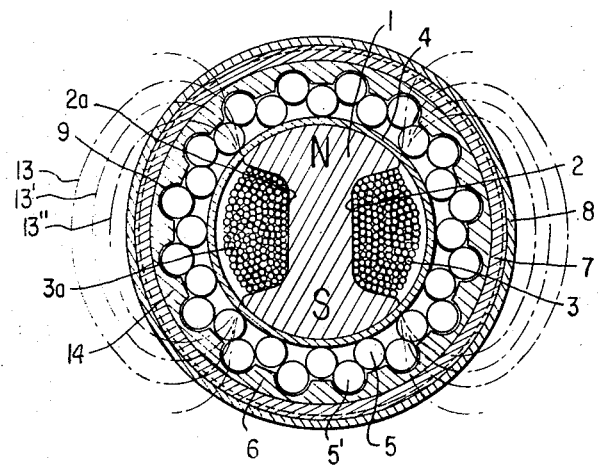

This invention relates to a method and apparatus for winding tapes or filaments onto a winding core mounted on a winding shaft, wherein the winding shaft is driven and the torque is transmitted with slip from the winding shaft to the winding core.

Although in the following the invention is described with reference to tapes, it also includes winding up filaments, yarns, and similar objects in a corresponding manner. The expression "tape" is not restricted to material of a limited width but may be a tape or web of any width.

Methods of the type mentioned above are necessary for winding up a tape with the application of torques not exceeding a predetermined maximum value or to permit the continuous action of a torque having a predetermined maximum value, the winding shaft in the latter case being driven with a lead relative to the winding core. The latter winding method and the devices used therefor are used primarily in those cases where various tapes are longitudinally cut from an appropriately wide web and then wound onto winding cores, two or more of which latter are mounted on a common winding shaft and driven thereby. The winding cores generally are mounted in a staggered manner onto two winding shafts parallel to each other in a manner such that one of the two winding cores onto which adjacent tapes of the row of the cut tapes are wound is mounted on one winding shaft and the other winding core is mounted on the other winding shaft.

For winding up a number of tapes in such a manner, particularly tapes of plastic films, at least two of which are taken up by a winding shaft, various devices are known for generating the required friction between the winding shaft and the winding core. Such devices generally are employed in the frequently occurring case that the winding shaft is driven by a source of power at a greater speed than are the windings or rolls to be formed, a relative motion between the winding shaft and the windings resulting therefrom and a torque determining the winding tension being transmitted to the individual coil or the winding core. Thus, differences in the thickness of the web may produce windings of each tape cut from the web of different diameters without the formation of the individual rolls being affected by the different winding speeds resulting therefrom. In addition to the aforementioned lead of the winding shaft, it is necessary that the torque of the winding shaft be greater than the sum of the torques of all individual friction devices on the shaft.

In a known device, winding cores onto which tapes are to be wound are spaced from each other on two parallel winding shafts and between the winding cores at both front surfaces thereof entrainer discs provided with friction linings are mounted, which discs can be moved axially on the winding shaft but are not subjected to torsion from the shaft. By means of a spring mounted on the shaft, the initial tension of which is adjustable, the cores and entrainer discs are axially pressed against each other so that all cores rotate if both shafts rotate. Since the tapes alternately are wound onto cores mounted on different shafts, this embodiment requires that, besides the friction discs, intermediate rings, shims and the like must be employed. A considerable disadvantage resulting therefrom is that, in order to remove all wound-up cores from the shaft, not only the cores with the wound-up tapes but also all other parts must be removed from the shaft after each winding operation. When re-using the device, all individual parts and new cores must be placed on the shaft in succession and then the friction must be adjusted. The quality of the windings considerably depends upon the skill of the operator. For this reason, incorrect adjustments often occur in practice. Furthermore attrition is caused e.g. by the felt discs and small pieces may be included in the windings.

Devices are also known in which the winding cores mounted side by side and friction discs which in pairs are coupled with the shaft are pressed together by means of hydraulic or pneumatic cylinders, the effective pressure of which is adjustable during the formation of the winding. Such devices include complicated rods and transmission tubes, air or oil connections and valve mechanisms but permit only an approximate and inexactly defined adjustment. This also results from the fact that the use of friction discs as such does not permit a sufficiently adjustable transmission of the torque since when slightly axially adjusting the discs friction values of unknown and completely variable magnitudes are obtained. The use of intermediate rings required for absorption and consisting of felt, a plastic or a similar material, results in an undesirable attrition. Axially pressing the felt discs together, for example, also alters the spacing of the mounted cores or tubes. The heat resulting from friction and the expansion in the axial direction resulting therefrom entails further considerable difficulties as regards the adjustment of the suitable torque.

The present invention improves the initially aforementioned method for winding up tapes or filaments in a manner such that, to an exact degree, uniformly wound tapes or filaments are obtained and the desired winding tension can be adjusted. This is achieved in that the winding shaft is driven and the torque is transmitted with slip from the winding shaft to the winding core in a manner such that, for transferring the torque, a radial magnetic field rotating with the winding shaft, and a torque acting upon the winding core by means of the rotating magnetic field, are produced.

The magnetic field rotating with the winding shaft is produced, for example, by inserting a permanent magnet into a depression in the winding shaft at the desired place, the magnet being inserted in a manner such that the poles thereof produce an external radial magnetic field. The winding core is mounted on the winding shaft within the magnetic field and is either metallic itself or is mounted on a metallic winding core carrier. The magnet rotates with the rotating winding shaft and thereby produces a torque in the direction of rotation of the magnet in the metallic objects within the magnetic field. The torque acting upon the winding core therefore always is of equal magnitude at a predetermined number of revolutions of the winding shaft, provided the strength of the magnetic field and its position relative to the winding core remain unchanged. If the generated torque is to be changed, the permanent magnet in the winding shaft must be radially displaced or metallic screens must be inserted between the magnet and the winding core.

Considerably simpler, however, is the adjustment of the strength of the magnetic field if it is produced by an electric current. This method, therefore, is preferable. The method of the present invention is further described below in an embodiment in which the magnetic field is produced by an electric current.

The apparatus for the performance of the method of the invention comprises at least one winding core rotatable on a winding shaft, a device for transmitting with slip the torque from the winding shaft to the winding core, a magnetic system with an external radial magnetic field being located in the winding shaft and connected therewith, and means connecting the winding core with magnetizable bodies which are within the magnetic field. The embodiment is preferred in which the winding core is closely connected with a cage which includes roll bodies with little play between the latter and the cage and also between the roll bodies and their path on the winding shaft, in which the roll bodies are positioned around the winding shaft within the magnetic field and the winding core is mounted on the winding shaft independently of the roll bodies. If several winding cores are mounted on the winding shaft, the aforementioned preferred embodiment advantageously is of a construction such that the winding shaft is provided with grooves containing electric windings which, together with the magnetic shaft, form the magnetic system and, furthermore, that above the windings on the winding shaft sleeves are provided as a path for the roll bodies. Also, a sleeve, together with a roll body cage and the roll bodies therein, forms a friction device which can be removed from the winding shaft as a unit and the device is closely connected to, but removable from, a winding core.

The electric windings form a long coil with a magnetic field around the shaft. The current supply to the coil is effected, for example, by means of sliding contacts located at the end of the winding shaft, the field strength of the magnet being regulated by means of the applied voltage.

In order to transfer a torque by means of the magnetic field from the winding shaft to the friction devices which are mounted side by side on the winding shaft and are rotatable individually and independently, the interior of the friction device, for example, is provided with an annular chamber containing a plurality of rolls arranged in one or more rows. The inner wall of this chamber is depressed in a manner such that it surrounds a part of the rolls and thus forms a cage for them. By known means, for example by bearings, the annular chamber provided with the depressions is enabled to move relatively to the winding shaft. By means of a suitable tension device, the winding core is connected with the outer ring and the chamber lining. The tension device may be constructed in a manner such that all friction devices remain on the winding shaft when the wound rolls are removed and new winding cores are remounted.

In the winding method, the individual remounted rolls are displaced along the shaft and thus come into more or less strong sectors of the magnetic field. The continuous cutting of the magnetic lines of flux resulting therefrom causes a resistance to the rotation of the roll bodies relative to the shaft. Since the shaft rotates at a speed slightly greater than that of the outer ring rotating with he core, a constant torque is transmitted to the core by means of the rolls retained by the outer ring. Since all friction devices require an equal sector of the magnetic field because of their uniform widths, a completely uniform web tension is ensured for all cut strips, even when the individual windings have different diameters because of different strengths of the web to be divided.

There is no difficulty in maintaining a constant torque, and thus a constant magnetic field strength, by known electric or electronic means, which results in a decreasing winding characteristic for the winding, or in regulating the current passing through the magnet coil in a manner such that the web tension, for example, is maintained during the entire winding operation. The voltage applied to the long-coil magnets in the winding shaft steadily increases with the increase of the winding diameter. It is also possible to automatically regulate another winding characteristic suitable for the material by means of adequate controlling and regulating devices for the circuit, which are commercially available.

Figure 2:
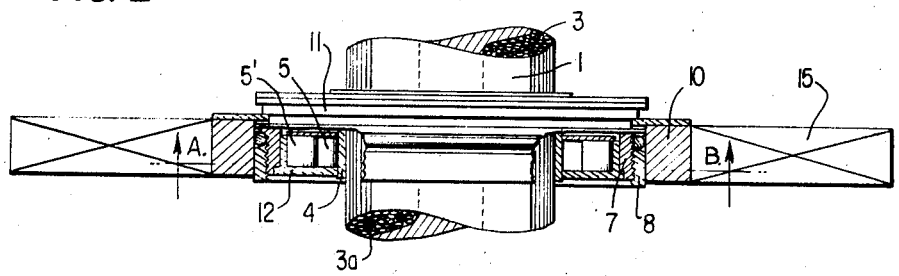
Figure 3:
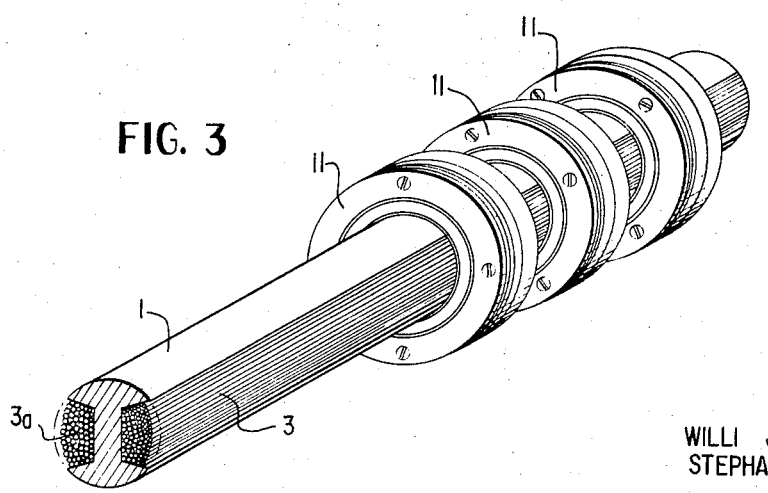
Figure 4:
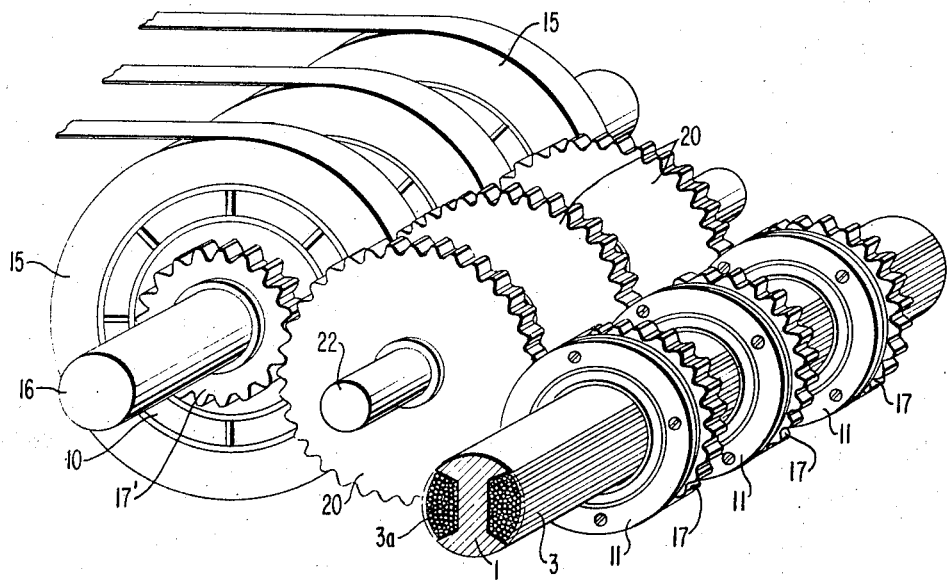
Figure 5:
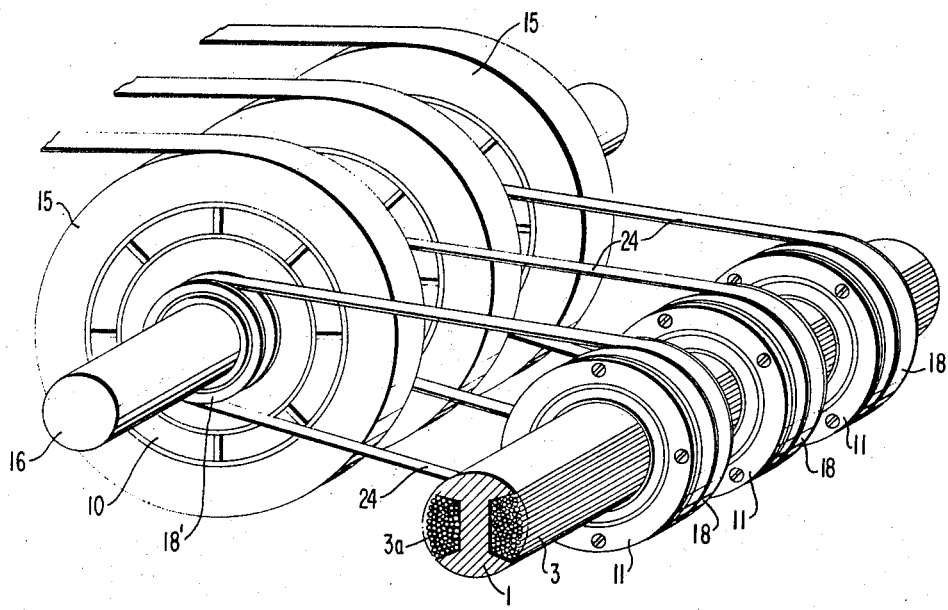

The present invention is further illustrated in the accompanying drawings in which:

FIGURE 1 is a sectional view of one embodiment of the present invention taken on line A–B of FIGURE 2, FIGURE 2 is a plan view of a portion of the apparatus of FIGURE 1 partially in section, FIGURE 3 is a perspective view of a portion of the apparatus, FIGURE 4 is a top perspective view of a modified form of the invention, and FIGURE 5 is a top perspective view of still another modified form of the invention.

In the embodiment illustrated in the drawings, a pair of grooves 2 and 2a are provided along a winding shaft 1 and contain the coil windings 3 and 3a, respectively, so that when a voltage is applied, a magnetic field is produced. In the cage 6 of the friction device 11 mounted on the shaft 1, the rolls 5 and 5' are arranged in one or more, preferably two, rows, the ridges 14 of the cage 6 projecting into the roll path causing the rolls 5 and 5' to roll only then when the cage 6 rotates realtive to the shaft 1. The magnetic lines of flux 13, 13', 13'', penetrate a portion of the rolls 5 and 5' so that the resistance to the rolling motion of the rolls, caused by the continuous cutting of the magnetic lines of flux, is transmitted to the cage 6 when passing through the different zones of the magnetic field, and, when the winding shaft rotates with an advance compared to the cage 6, this resistance acts as torque upon the winding core 10 of the shaft 1, the winding core being connected with the outer ring 7 and thus with the cage 6. The friction devices 11 are mounted in special bearings on the winding shaft. Instead of the rolls 5 and 5' acting as magnetic resistances, roll bodies of another geometrical shape, such as balls, cones, rings, or gear wheels, also may be used.

As shown in FIGURE 1, the winding shaft has the form of an I. The milled grooves 2 and 2a contain the windings 3 and 3a, respectively. An annular sleeve 4 mounted on the shaft 1 serves as a support for the roll bodies 5 and 5'. The cage 6 surrounding a part of the rolls is connected with the outer ring 7 and the outer tension device. The recesses 9 of the cage 6 are formed in a manner such that the rolls 5 and 5' have sufficient play to roll easily. When the current passes through the winding 3 which is secured and protected by the addition of a synthetic resin, the upper bar of the I of the shaft 1 may be regarded as a north pole, for example, and, consequently, the lower bar as a south pole. The magnetic lines of flux 13, 13', 13'', on their way from the north to the south pole, pass through the rolls 5 and 5' which, by the relative motion between the shaft 1 and the cage 6, with the outer ring 7, successively come within the different zones of strength of the magnetic field and the magnetic lines of flux continuously are cut during the rolling action of the rolls at the periphery of the shaft 1. This causes a resistance to the rolling motion which is transmitted from the cage 6 to the outer ring 7 and thus to the core 10. A torque, adjustable by means of the circuit, is transmitted in this manner from the shaft 1 to the outer ring 7.

The friction device 11 shown in FIGURE 2 contains a bearing of known construction, not shown in FIGURE 2. It permits a relative motion between the shaft 1 and the outer ring 7, independently of the cage 6 and the rolls 5 and 5', so that each individual friction device can rotate on the shaft independently of adjacent devices. The outer ring 7 is connected with the tension device 8 and supports the winding core 10, or other device transmitting the rotation, and the winding 15. Being attracted by the magnetic field, the rolls 5 and 5' run on the annular sleeve 4 surrounding the shaft 1. The cover 12 of the cage 6 prevents the rolls 5 and 5' from becoming displaced.

FIGURE 3 shows a portion of the winding shaft 1 with closed friction devices 11 mounted thereon. The distance of the friction devices 11 from each other is maintained by spacers, not shown. The zones of action of the windings 3 and 3a along the shaft are shown in the end of the shaft 1.

The construction shown in FIGURES 1 to 3 of a friction device represents only one embodiment of the versatile applications of the method. For example, in the cage which contains the roll bodies transmitting the torque, the blocking elements which limit the movability of the roll bodies may be rotatable in roll bearings in order to decrease the friction losses. In another variation, a winding core is mounted on two or more friction devices and driven thereby. This type of construction has proved to be suitable in cases where the device is used for winding up wide tapes.

According to a further modification of the method and apparatus of the present invention, the winding core is supported by a core shaft which is separate from the winding shaft. Instead of being connected with the winding core, the magnetic body or unit of magnetic bodies transmitting the torque is connected with an element for transmitting the torque such as a gear rim, a pulley rim, or a friction rim.

FIG. 4 illustrates the modification of the invention wherein the winding cores 10 are supported by a core shaft 16 disposed in spaced parallel relationship to winding shaft 1. A gear 17 is connected with each of the friction devices 11. Each of these gears is in turn in mesh with an intermediate gear 20 supported by shaft 22. The gears 20 are in turn in mesh with gears 17' drivingly connected with the respective winding cores on core shaft 16, whereby the drive is transmitted from the friction devices 11 to the winding cores.

Referring now to FIG. 5, still another modified form of the invention is illustrated. In this modification, the winding cores 10 are supported by a core shaft 16. A pulley 18 is interconnected with each of the friction devices 11, each of these pulleys 18 having a belt 24 trained thereover. The belts are also trained over pulleys 18' which are drivingly connected with the respective winding cores mounted on core shaft 16 whereby drive is transmitted from the friction devices to the winding cores.

The bearing used for the outer ring 7 rotating around the shaft, together with the cage 6, during the relative motion may consist of known elements such as ball bearings, roller bearings, or the like.

The advantages of the present invention over the known methods and apparatus are apparent. By means of the method of the present invention and the corresponding apparatus, very uniform windings can be obtained when the current intensity is once determined. Even operators with little experience can perform the method. Also when using very thin tapes, for example of a few microns thickness, the necessary values of web tension can be adjusted very accurately. Furthermore, the friction devices need not be removed from the winding shaft when changing the winding cores. They require no, or only little, space exceeding the width of the winding.

It will be obvious to those skilled in the art that many modifications may be made within the scope of the present invention without departing from the spirit thereof, and the invention includes all such modifications.

What is claimed is:

1. A winding apparatus for winding up tapes, filaments, and the like, which comprises a winding shaft having longitudinally extending recess means therein, means positioned within said recess means and extending longitudinally of such winding shaft for generating a radial external magnetic field extending along a substantial length of said winding shaft, a winding core, means supporting said winding core in surrounding relationship to said winding shaft, an annular space being defined between a portion of said winding core and portion of said winding shaft, and magnetizable means movably mounted within said annular space for transferring torque from said winding shaft to said winding core.

2. A winding apparatus according to claim 1 in which the means for generating an external magnetic field is an electromagnet.

3. A winding apparatus according to claim 1 in which the magnetizable means is a plurality of rollers.

4. A winding apparatus according to claim 3 including sleeve means mounted on the winding shaft and forming a supporting surface for the rollers.

5. A winding apparatus according to claim 3 including means for positioning the rollers in a plurality of generally radially aligned rows.

6. A winding apparatus according to claim 1 including tension means mounted intermediate the winding core and the winding shaft.

7. A method of winding up tapes, filaments, and the like, which comprises generating an external magnetic field around a rotating winding shaft and extending along a substantial length of the winding shaft, providing a plurality of winding cores in surrounding relationship to the shaft and spaced longitudinally therealong, and transmitting the torque of the winding shaft from the winding shaft through the intermediary of said longitudinally extending magnetic field to each of the plurality of winding cores associated with the shaft.

8. A winding apparatus for winding up tapes, filaments, and the like, which comprises a winding shaft having longitudinally extending recess means therein, means positioned within said recess means and extending longitudinally of such winding shaft for generating a radial external magnetic field extending along a substantial length of said winding shaft, a friction device, means supporting said friction device in surrounding relationship to said winding shaft, an annular space being defined between a portion of said friction device and said winding shaft, magnetizable means movably mounted within said annular space for transferring torque from said winding shaft to said friction device, a core shaft separate from said winding shaft, a winding core mounted on said core shaft, and means for transmitting drive from said friction device to said winding core.

References Cited

UNITED STATES PATENTS

| 2,684,210 | 7/1954 | Conti | 242—56.9 |
| 3,010,671 | 11/1961 | Brown | 242—56.9 |
| 3,179,218 | 4/1965 | Burns | 192—40 X |

FOREIGN PATENTS 140,705  4/1951  Australia.

WILLIAM S. BURDEN, *Primary Examiner.*

U.S. Cl. X.R.

192—21.5, 84; 242—56.9